(12) United States Patent
Sorensen et al.

(10) Patent No.: US 11,104,459 B2
(45) Date of Patent: Aug. 31, 2021

(54) SYSTEMS FOR CAPTURING A CLIENT VEHICLE

(71) Applicant: Northrop Grumman Systems Corporation, Plymouth, MN (US)

(72) Inventors: Peter O. Sorensen, Santa Barbara, CA (US); Matthew Alan Michel, Oak Hill, VA (US); William A. Llorens, Herndon, VA (US); David M. Murphy, Goleta, CA (US); Jeffrey Braden, Dulles, VA (US); Michael Edward McEachen, Santa Barbara, CA (US); Michael Foster, Dulles, VA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 482 days.

(21) Appl. No.: 15/829,807

(22) Filed: Dec. 1, 2017

(65) Prior Publication Data

US 2018/0297723 A1 Oct. 18, 2018

Related U.S. Application Data

(60) Provisional application No. 62/484,965, filed on Apr. 13, 2017.

(51) Int. Cl.
*B64G 1/64* (2006.01)

(52) U.S. Cl.
CPC .................... *B64G 1/646* (2013.01)

(58) Field of Classification Search
CPC ........ B64G 1/646; B64G 1/64; B64G 1/1078; B64D 39/06
See application file for complete search history.

(56) References Cited

U.S. PATENT DOCUMENTS

| 3,508,723 A | | 4/1970 | Warren et al. |
| 4,018,409 A | * | 4/1977 | Burch .................... B64G 1/646 244/172.4 |

(Continued)

FOREIGN PATENT DOCUMENTS

| EP | 0092602 A1 * | 11/1983 | ............. B64G 1/646 |
| EP | 541052 A1 | 5/1993 | |

(Continued)

OTHER PUBLICATIONS

Makoto, Docking unit between modules, 1989, JP1226497, English translation. (Year: 1989).*

(Continued)

*Primary Examiner* — Magdalena Topolski
(74) *Attorney, Agent, or Firm* — Phillips Winchester (57) ABSTRACT

Capture assemblies and compliant extension assemblies may be utilized for insertion into a nozzle of a liquid engine of a spacecraft. The capture assembly may include an apparatus such as a probe for insertion into the nozzle and an assembly at least partially enclosed in a forward portion of the probe. The assembly may include a plurality of actuated fingers for deploying outwardly from the probe when the probe is inserted into the nozzle. The compliant extension assembly may be at least partially enclosed in a housing connected to the capture assembly for axial movement of the probe. The compliant extension assembly may facilitate axial movement of the probe between a retracted position and an extended position, wherein the probe is extended forwardly, relative to the housing.

20 Claims, 9 Drawing Sheets

(56) References Cited

U.S. PATENT DOCUMENTS

| | | | |
|---|---|---|---|
| 4,177,964 A * | 12/1979 | Hujsak | B64G 1/646 |
| | | | 114/250 |
| 4,195,804 A | 4/1980 | Hujsak et al. | |
| 4,219,171 A | 8/1980 | Rudmann | |
| 4,391,423 A | 7/1983 | Pruett et al. | |
| 4,588,150 A | 5/1986 | Bock et al. | |
| 4,664,344 A | 5/1987 | Harwell et al. | |
| 4,898,348 A | 2/1990 | Kahn | |
| 5,005,786 A | 4/1991 | Okamoto et al. | |
| 5,040,749 A | 8/1991 | Caldwell | |
| 5,094,410 A | 3/1992 | Caldwell | |
| 5,169,094 A | 12/1992 | Maute et al. | |
| 5,299,764 A | 4/1994 | Scott | |
| 5,364,046 A | 11/1994 | Dobbs et al. | |
| 5,372,340 A | 12/1994 | Hirokazu et al. | |
| 5,490,075 A | 2/1996 | Howard et al. | |
| 5,511,748 A | 4/1996 | Scott | |
| 5,735,488 A | 4/1998 | Schneider | |
| 5,803,407 A | 9/1998 | Scott | |
| 5,806,802 A | 9/1998 | Scott | |
| 6,017,000 A | 1/2000 | Scott | |
| 6,299,107 B1 | 10/2001 | Kong et al. | |
| 6,330,987 B1 | 12/2001 | Scott | |
| 6,484,973 B1 | 11/2002 | Scott | |
| 6,523,784 B2 | 2/2003 | Steinsiek et al. | |
| 6,742,745 B2 | 6/2004 | Tchoryk et al. | |
| 6,843,446 B2 | 1/2005 | Scott | |
| 6,945,500 B2 | 9/2005 | Wingo | |
| 6,969,030 B1 | 11/2005 | Jones et al. | |
| 7,070,151 B2 | 7/2006 | D'Ausilio et al. | |
| 7,104,505 B2 | 9/2006 | Tchoryk et al. | |
| 7,207,525 B2 | 4/2007 | Bischof et al. | |
| 7,216,833 B2 | 5/2007 | D'Ausilio et al. | |
| 7,216,834 B2 | 5/2007 | D'Ausilio et al. | |
| 7,240,879 B1 | 7/2007 | Cepollina et al. | |
| 7,293,743 B2 | 11/2007 | Cepollina et al. | |
| 7,370,834 B2 | 5/2008 | Scott | |
| 7,438,264 B2 | 10/2008 | Cepollina et al. | |
| 7,461,818 B2 | 12/2008 | D'Ausilio et al. | |
| 7,484,690 B2 | 2/2009 | D'Ausilio et al. | |
| 7,513,459 B2 | 4/2009 | Cepollina et al. | |
| 7,513,460 B2 | 4/2009 | Cepollina et al. | |
| 7,575,199 B2 | 8/2009 | D'Ausilio et al. | |
| 7,588,213 B2 | 9/2009 | D'Ausilio et al. | |
| 7,611,096 B2 | 11/2009 | D'Ausilio et al. | |
| 7,611,097 B2 | 11/2009 | D'Ausilio et al. | |
| 7,624,950 B2 | 12/2009 | D'Ausilio et al. | |
| 7,815,149 B1 | 10/2010 | Howard et al. | |
| 7,823,837 B2 | 11/2010 | Behrens et al. | |
| 7,828,249 B2 | 11/2010 | Ritter et al. | |
| 7,857,261 B2 | 12/2010 | Tchoryk, Jr. et al. | |
| 7,861,974 B2 | 1/2011 | Hays et al. | |
| 7,861,975 B2 | 1/2011 | Behrens et al. | |
| 7,992,824 B2 | 8/2011 | Tchoryk, Jr. et al. | |
| 8,006,937 B1 | 8/2011 | Romano et al. | |
| 8,006,938 B2 | 8/2011 | Behrens et al. | |
| 8,016,242 B2 | 9/2011 | Baumann | |
| 8,033,508 B2 | 10/2011 | Baumann et al. | |
| 8,056,864 B2 | 11/2011 | Hays et al. | |
| 8,074,935 B2 | 12/2011 | Gryniewski et al. | |
| 8,181,911 B1 | 5/2012 | Gryniewski et al. | |
| 8,196,870 B2 | 6/2012 | Gryniewski et al. | |
| 8,205,838 B2 | 6/2012 | Moorer, Jr. et al. | |
| 8,240,613 B2 | 8/2012 | Ritter et al. | |
| 8,245,370 B2 | 8/2012 | Ritter et al. | |
| 8,333,347 B2 | 12/2012 | Ritter et al. | |
| 8,412,391 B2 | 4/2013 | Paluszek et al. | |
| 8,448,904 B2 | 5/2013 | Gryniewski et al. | |
| 8,899,527 B2 | 12/2014 | Allen et al. | |
| 9,108,747 B2 | 8/2015 | Roberts et al. | |
| 9,302,793 B2 | 4/2016 | Ghofranian et al. | |
| 9,321,175 B2 | 4/2016 | Smith | |
| 9,399,295 B2 | 7/2016 | Roberts et al. | |
| 2004/0026571 A1 | 2/2004 | Scott | |
| 2006/0145024 A1 | 7/2006 | Kosmas | |
| 2006/0151671 A1 | 7/2006 | Kosmas | |
| 2007/0228220 A1 | 10/2007 | Behrens et al. | |
| 2009/0001221 A1 | 1/2009 | Collyer | |
| 2012/0112009 A1 | 5/2012 | Gryniewski et al. | |
| 2012/0325972 A1 | 12/2012 | Gryniewski et al. | |
| 2013/0103193 A1 | 4/2013 | Roberts et al. | |
| 2015/0008290 A1 | 1/2015 | Bigelow | |
| 2015/0314893 A1 | 11/2015 | Rembala et al. | |
| 2016/0039543 A1 | 2/2016 | Roberts et al. | |
| 2016/0039544 A1 | 2/2016 | Roberts et al. | |

FOREIGN PATENT DOCUMENTS

| | | |
|---|---|---|
| EP | 741655 B1 | 2/2004 |
| EP | 1654159 A1 | 5/2006 |
| EP | 741655 B2 | 5/2010 |
| JP | 01226497 | 9/1989 |
| JP | 01282098 A | 11/1989 |
| RU | 2503593 C2 | 1/2014 |
| WO | 2005110847 A1 | 11/2005 |
| WO | 2005118394 A1 | 12/2005 |
| WO | 2014024199 A1 | 2/2014 |
| WO | 2016030890 A1 | 3/2016 |

OTHER PUBLICATIONS

Fehse "Automated Rendezvous and Docking of Spacecraft", (15 pages) Cambridge University Press (2003).

Medina et al. "Towards a Standardized Grasping and Refueling On-Orbit Servicing for Geo Spacecraft", cta Astronautica 134 1-10 (2017).

Reintsema et al. "DEOS—The In-Flight Technology Demonstration of German s Robotics Approach to Dispose Malfunctioned Satellites" (8 pages).

Sellmaier et al. "On-Orbit Servicing Missions: Challenges and Solutions for Spacecraft Operations" SpaceOps 2010 Conference, AIAA 2010-2159 (2010).

International Search Report for International Application No. PCT/US2018/017865 dated May 15, 2018, 4 pages.

Written Opinion of the International Search Authority for International Application No. PCT/US2018/017865 dated May 15, 2018, 10 pages.

V.S. Syromyatnikov. Docking devices of spacecraft. M. "Mechanical Engineering". 1984; pp. 16-21, 61-62, 85, 87-88, drawings 1.7-1.8, 3.7, 3.8, tabl. 1.2.

* cited by examiner

SYSTEMS FOR CAPTURING A CLIENT VEHICLE

CROSS-REFERENCE TO RELATED APPLICATION

This application claims the benefit under 35 U.S.C. § 119(e) of U.S. Provisional Patent Application Ser. No. 62/484,965, filed Apr. 13, 2017, the disclosure of which is hereby incorporated herein in its entirety by this reference.

TECHNICAL FIELD

The present disclosure relates to systems, devices, assemblies, apparatus, and methods for spacecraft docking, and more specifically, to a capture assembly including an apparatus for insertion and capture of an engine of a spacecraft and related methods.

BACKGROUND

Thousands of spacecraft orbit the Earth for performing various functions including, for example, telecommunication, GPS navigation, weather forecasting, and mapping. Like all machines, spacecraft periodically require servicing to extend their functioning life span. Servicing may include, for example, component repair, refueling, orbit raising, station-keeping, momentum balancing, or other maintenance. To accomplish this, a servicing spacecraft may be sent into orbit to dock with a client spacecraft requiring maintenance, and subsequent to docking, perform life-extending maintenance on the client. Spacecraft docking generally involves "cooperative" targets, where a first spacecraft attaches to a second spacecraft that is designed to be docked with. However, various spacecraft do not have dedicated docking features. Such spacecraft will often have liquid apogee engines and a launch vehicle separation ring. These spacecraft still benefit from servicing, but provide added difficulty due to the lack of dedicated docking features. Without life extension maintenance, these spacecraft may fall out of service, and replacement is generally extraordinarily expensive and can have a lead time of years.

Conceptualized methods of docking to spacecraft consist of complex mechanical implements. Various patents and publications have considered such methods, including U.S. Pat. Nos. 3,508,723, 4,219,171, 4,391,423, 4,588,150, 4,664,344, 4,898,348, 5,005,786, 5,040,749, 5,094,410, 5,299,764, 5,364,046, 5,372,340, 5,490,075, 5,511,748, 5,735,488, 5,803,407, 5,806,802, 6,017,000, 6,299,107, 6,330,987, 6,484,973, 6,523,784, 6,742,745, 6,843,446, 6,945,500, 6,969,030, 7,070,151, 7,104,505, 7,207,525, 7,216,833, 7,216,834, 7,240,879, 7,293,743, 7,370,834, 7,438,264, 7,461,818, 7,484,690, 7,513,459, 7,513,460, 7,575,199, 7,588,213, 7,611,096, 7,611,097, 7,624,950, 7,815,149, 7,823,837, 7,828,249, 7,857,261, 7,861,974, 7,861,975, 7,992,824, 8,006,937, 8,006,938, 8,016,242, 8,056,864, 8,074,935, 8,181,911, 8,196,870, 8,205,838, 8,240,613, 8,245,370, 8,333,347, 8,412,391, 8,448,904, 8,899,527, 9,108,747, 9,302,793, 9,321,175, and 9,399,295; U.S. Patent Application Pub. Nos. 2004/0026571, 2006/0145024, 2006/0151671, 2007/0228220, 2009/0001221, 2012/0112009, 2012/0325972, 2013/0103193, 2015/0008290, 2015/0314893, 2016/0039543, and 2016/0039544; European Patent Nos. EP0541052, 0741655 B1, 0741655 B2, and 1654159; PCT Pub. Nos. 2005/110847, 2005/118394, 2014/024,199, and 2016/030890; Japan Patent No. JPH01282098; *Automated Rendezvous and Docking of Spacecraft*, Fehse, Wigbert, Cambridge University Press (2003); *On-Orbit Servicing Missions: Challenges and Solutions for Spacecraft Operations*, Sellmaier, F., et al., SpaceOps 2010 Conference, AIAA 2010-2159 (2010); and *Towards a standardized grasping and refueling on-orbit servicing for geo spacecraft*, Medina, Alberto, et al., Acta Astronautica vol. 134, pp. 1-10 (2017); DEOS—The In-Flight Technology Demonstration of German's Robotics Approach to Dispose Malfunctioned Satellites, Reintsema, D., et al., the disclosure of each of which is hereby incorporated herein in its entirety by this reference. However, mechanical complexity increases the likelihood of component failure, which can result in failure in the docking and maintenance process. Accordingly, an improved capture assembly for docking to a spacecraft is desirable.

BRIEF SUMMARY

Some embodiments of the disclosure are directed to a servicer spacecraft, also known as a mission extension vehicle ("MEV"), with a capture assembly for docking to a liquid engine of a client vehicle. In some embodiments, the MEV includes a capture assembly comprising a client spacecraft grasping portion and a compliant extension assembly. The grasping portion may comprise an apparatus such as a probe for insertion into a nozzle of the liquid apogee engine. The compliant extension assembly may provide for the extension and retraction of the probe. The probe may have a deployable assembly at a forward portion for engagement with an interior surface of a combustion chamber of the liquid apogee engine.

Some embodiments of the disclosure allow a spacecraft (e.g., a servicer) to dock to another spacecraft (e.g., a client) in cases where the client may not be designed to be docked with, but has design features suitable for connection to the capture assembly including, for example, a launch vehicle separation ring (or 4-point mount), and a liquid apogee engine. For example, embodiments of the disclosure may be used to dock to geostationary communication satellites, or various other spacecraft that do not have specifically designated docking hardware and/or docking assist features.

Some embodiments provide benefits in the form of a relatively simple docking architecture with compliancy for improved reliability and safety, that is, preventing damage to the spacecraft. For example, some embodiments may reduce mechanical complexity of the docking apparatus by utilizing two motors for the docking process. In that embodiment, one motor may be used for extension and retraction of the probe, and another motor may be used for actuation of a finger assembly, reducing points of failure in the capture assembly. Some embodiments utilize a finger assembly design that is actively driven open and closed by a motor, as opposed to spring operated. In some embodiments, the finger assembly may be driven open or closed by a spring assembly.

The finger assembly may include a plurality of fingers disposed at the forward portion of the probe body portion. A first actuator may facilitate configuring the plurality of fingers between an undeployed position, wherein the plurality of fingers are positioned aligned with the probe, and a deployed position, wherein each of the plurality of fingers are rotated about the pivotally connected rearward portion, extending the forward tip outwardly relative to a substantially cylindrical sidewall. In one or more embodiments, the capture assembly includes an extension member at least partially enclosed in a housing. The extension member may be connected to the rearward portion and cooperatively connected to a second actuator for axial movement of the probe. The axial movement of the probe may position the capture assembly between a retracted position, wherein the probe is positioned at least adjacent to the housing, and an extended position, wherein the probe is extended forwardly, relative to the housing.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure.

DETAILED DESCRIPTION

As used herein, the term "substantially" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

Figure 1:
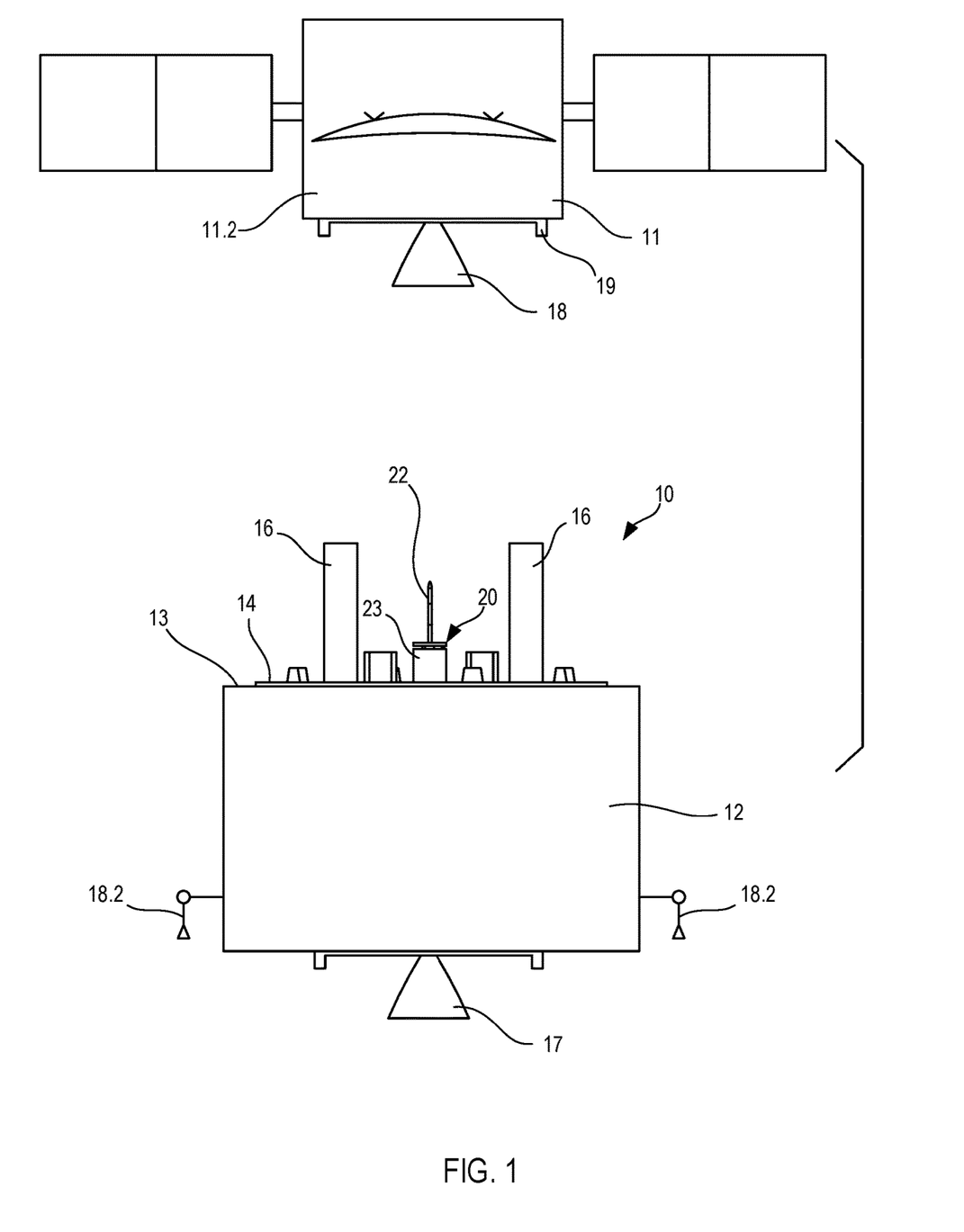
FIG. 1 is a side elevational view of a servicer spacecraft and a client satellite, according to one or more embodiments.

FIG. 1 depicts a side elevational view of the present disclosure in which a servicer spacecraft 10 may be operated to approach, capture, dock to, or service a client vehicle 11, according to one or more embodiments of the disclosure. Servicer spacecraft 10 and client vehicle 11 each may be a satellite or other spacecraft situated in orbit around a body. The servicer spacecraft 10 may be a spacecraft designed to approach, capture, dock to and undock from, and service a client vehicle 11. Servicer spacecraft 10 may facilitate providing services to client vehicle 11 including station-keeping, orbital raising, momentum balancing, attitude control, relocation, de-orbit, refueling, repair, or other services that may be provided on-orbit. Servicer spacecraft 10 may be designed to provide service to more than one client vehicle 11, and therefore may be provided with a docking mechanism that allows the servicer spacecraft 10 to dock and undock from multiple client vehicles 11, including where one or more of the client vehicles 11 comprises an engine 18 of a different size or shape from one or more of the other client vehicles 11. The servicer spacecraft 10 generally comprises a spacecraft body 12, a docking platform 14, stanchions 16, a main thruster 17, gimbaled thrusters 18.2 and a capture assembly 20.

Client vehicle 11 is a spacecraft that can be captured by the servicer spacecraft 10. Client vehicle 11 may be in low earth orbit, medium earth orbit, geosynchronous orbit, beyond geosynchronous orbit, or in another orbit around a body such as Earth. Client vehicle 11 has a body 11.2, an engine 18, and a separation ring 19. Engine 18 can be any type of suitable engine for a spacecraft. For example, in some embodiments, engine 18 is a liquid apogee engine, solid fuel motor, RCS thruster, or other type of engine or motor. Engine 18 may be positioned on the zenith deck of the client vehicle 11, which, in the case of a spacecraft orbiting the Earth, is a deck of the spacecraft substantially positioned opposite the Earth.

Capture assembly 20 of servicer spacecraft 10 may be configured to capture client vehicle 11 at engine 18 and to pull client vehicle 11 and servicer spacecraft 10 together for docking. When docked, stanchions 16 may abut separation ring 19 of client vehicle 11 and capture assembly 20 may retain the respective spacecraft together.

Figure 2:
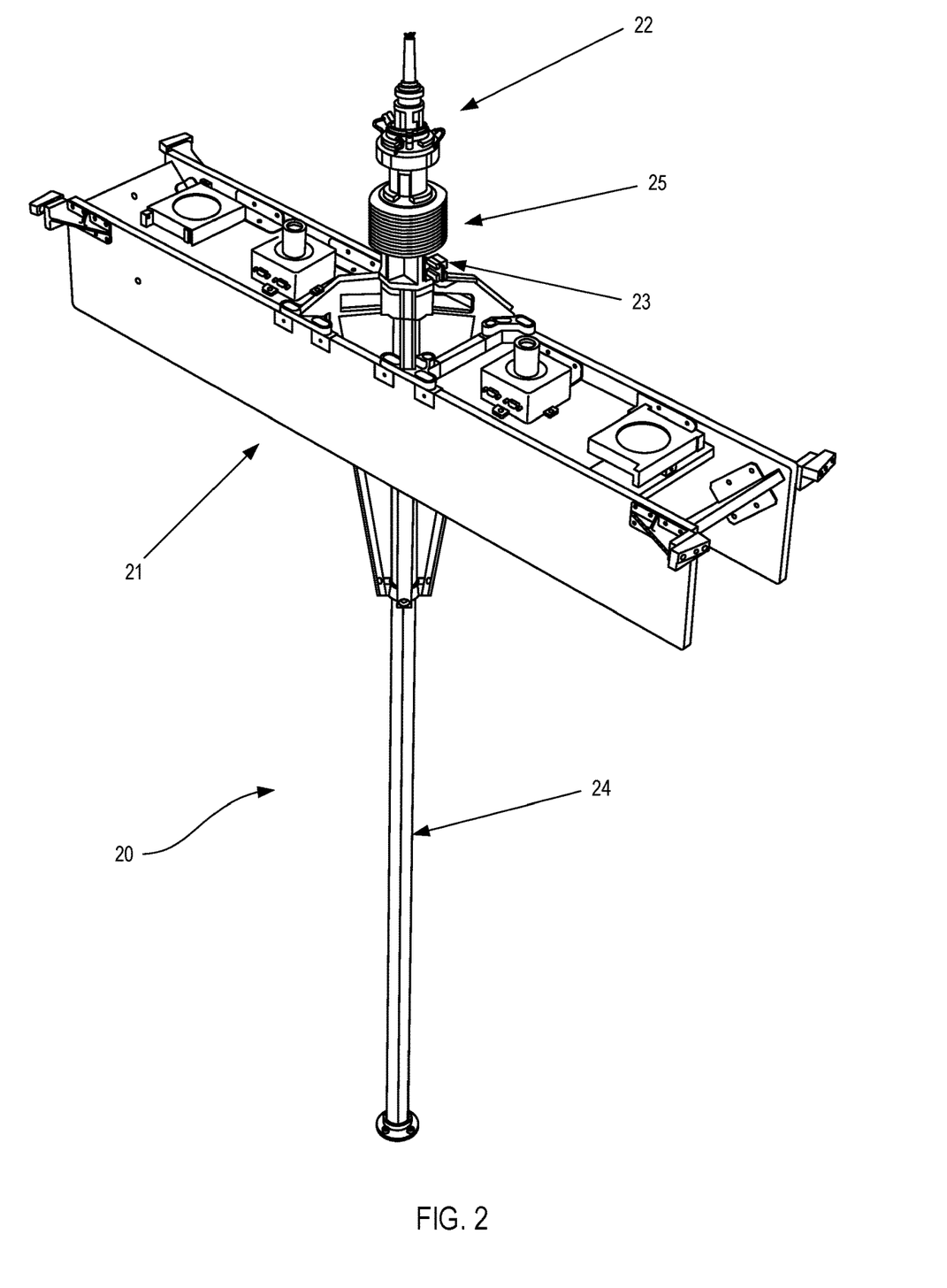
FIG. 2 is an isometric view of a capture assembly, according to one or more embodiments.

FIG. 2 depicts an isometric view of capture assembly 20 of servicer spacecraft 10 according to certain embodiments. In certain embodiments, capture assembly 20 includes a bus support structure 21 that provides support for components of the capture assembly 20. Capture assembly 20 includes a probe assembly 22 (see also FIG. 1). Probe assembly 22 may include functionality that allows for extension or retraction of a portion of probe assembly 22 to facilitate docking of servicer spacecraft 10 with client vehicle 11. When servicer spacecraft 10 is docked to client vehicle 11, a portion of probe assembly 22 may be inserted into engine 18. Capture assembly 20 may also include a compliant extension assembly 23 (see FIG. 1), which may include a lance comprising a compliant boom 43 (FIG. 13) and a sheath 24 for housing the compliant boom 43 in some embodiments. Boom 43 of compliant extension assembly 23 may be extended in a direction substantially away from or retracted in a direction substantially toward a nadir deck 13 (see FIG. 1) of servicer spacecraft 10 during operation. Docking of servicer spacecraft 10 to client vehicle 11 may include extending boom 43 from sheath 24 substantially in a direction toward engine 18 of client vehicle 11. In some embodiments, boom 43 of compliant extension assembly 23 may be extended up to two meters or more from sheath 24. Capture assembly 20 may further include harness 25 for providing electrical connection between probe assembly 22 and servicer spacecraft 10. Harness 25 may be provided as a spiral harness to facilitate the extension or retraction of boom 43.

Figure 3:
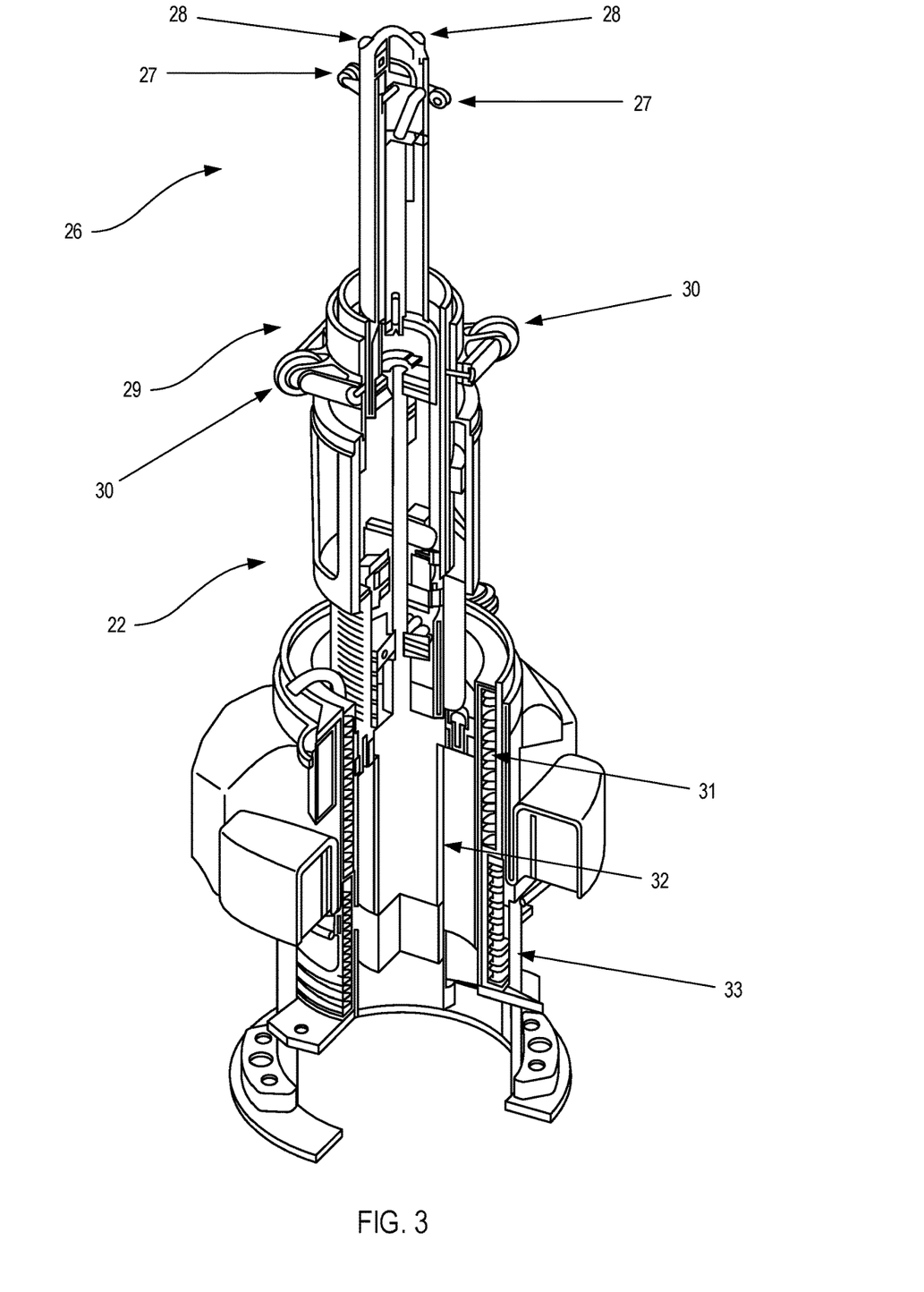
FIG. 3 is a partial cross-sectional side elevational view of a capture assembly, according to one or more embodiments.

FIG. 3 shows a perspective, partial cross-sectional view of probe assembly 22 according to one embodiment. A probe tip 26 is positioned at a distal end of probe assembly 22. Probe tip 26 may have one or more rollers, wheels, or other friction reducing apparatuses 28 positioned at its distal end. In various embodiments, there may be one, two, three, four, five or more rollers, wheels, or other friction reducing apparatuses 28 positioned at the distal end of probe tip 26. Friction reducing apparatuses 28 may be dry film lubricated and may have a spindle ratio of greater than or equal to 3. Probe tip 26 may be movably attached to probe assembly 22. In certain embodiments, probe assembly 22 may include boom compression spring 31. Boom compression spring 31 may assist in preventing boom 43 from being damaged upon contact of probe tip 26 with any part of client vehicle 11.

In some embodiments, probe tip 26 may include one or more fingers 27. In various embodiments, probe tip 26 may include one, two, three, four, or more fingers. Fingers 27 may be biased into an open position by a spring or other device. Fingers 27 may be compliant such that a biasing force imparted on fingers 27 may cause the fingers 27 to pivot in a direction toward probe tip 26 upon docking or undocking of servicer spacecraft 10 to client vehicle 11. A wheel, roller, or other friction reducing apparatus may be positioned at the end of one or more fingers 27 to reduce any frictional force imparted by fingers 27 upon docking or undocking of servicer spacecraft 10 to client vehicle 11. The wheel, roller, or other friction reducing apparatus positioned at the end of one or more fingers 27 may be dry film lubricated and may have a spindle ratio of greater than or equal to 3.

Probe assembly 22 may include a quillon assembly 29. Quillon assembly 29 may comprise one or more rollers 30. In various embodiments, quillon assembly 29 may include one, two, three, four, or more rollers 30. Rollers 30 may be dry film lubricated and may have a spindle ratio of greater than or equal to 3. Quillon assembly 29 may be movable relative to probe assembly 22 to facilitate docking of servicer spacecraft 10 to client vehicle 11. In some embodiments, quillon assembly 29 may include a translational joint slide allowing quillon assembly 29 to translate in an axial manner toward or away from probe tip 26. Upon docking of servicer spacecraft 10 to client vehicle 11, rollers 30 may contact a side wall of engine 18 of client vehicle 11 in a manner that may limit rotation of servicer spacecraft 10 in relation to client vehicle 11 during docking (e.g., to cinch or otherwise secure the client vehicle 11). Probe assembly 22 may also include an actuator 32. Actuator 32 may be configured to provide motion to actuate linear motion of components of probe assembly 22. Actuator 32 may cause an internal portion of probe tip 26 to move toward or away from client vehicle 11 that may assist in the docking or undocking of servicer spacecraft 10 to client vehicle 11. Actuator 32 may cause fingers 27 to retract in a direction toward probe tip 26 to facilitate the docking or undocking of servicer spacecraft 10 to client vehicle 11. In certain embodiments, probe assembly 22 may include boom tension indicator spring 33 or other components that facilitate providing a preload tension between servicer spacecraft 10 and client vehicle 11 or determining the amount of preload tension present when servicer spacecraft 10 and client vehicle 11 are docked.

The following discussion provides an example overview of the manner in which the components of capture assembly 20 may be used to dock servicer spacecraft 10 to client vehicle 11 according the embodiment depicted in FIG. 3. Upon approach of servicer spacecraft 10 to client vehicle 11, boom 43 of compliant extension assembly 23 may be partially extended from sheath 24. In some embodiments, quillons 29 are retracted before docking is initiated. When servicer spacecraft 10 is positioned relative to client vehicle 11 within a distance that allows boom 43 to extend at least a portion of probe assembly 22 into engine 18, boom 43 is extended into a nozzle of engine 18. The rate of extension of boom 43 may be implemented to reduce the amount of time friction can be present during the capture event, which in some embodiments may be greater than or equal to 15 millimeters per second. As fingers 27 approach the narrowest portion of engine 18 (sometimes referred to as the apex or throat 39 (see FIGS. 10 and 11)), fingers 27 may retract toward probe tip 26. Upon probe tip 26 passing through the apex or throat 39 of engine 18, springs or another apparatus 38 may bias fingers 27 (see FIG. 9) outward from probe tip 26 into a deployed position (e.g., in order to contact, secure, cinch, the client vehicle). For example, the fingers 27 (and/or the quillons 29) may be extended and/or secured passively (e.g., without the use of a motorized actuator) in the deployed position. In some embodiments, the insertion of probe tip 26 into engine 18 may create less than or equal to 5 millimeters/second delta velocity between servicer spacecraft 10 and client vehicle 11. Boom 43 may then be retracted toward servicer spacecraft 10 until stanchions 16 contact separation ring 19. In embodiments where quillons 29 have been retracted, quillons 29 may be extended to allow for contact between quillons 29 and sides of engine 18 (e.g., in order to contact, secure, cinch, the client vehicle). The boom 43 continues to retract toward servicer spacecraft 10 until a tension exists between servicer spacecraft 10 and client vehicle 11 sufficient to trigger the boom tension indicator spring 33 or other switch or indicator.

The following discussion provides an example overview of the manner in which the components of capture assembly 20 may be used to undock servicer spacecraft 10 from client vehicle 11. Boom 43 of compliant extension assembly 23 may be extended in a direction away from servicer spacecraft 10 toward client vehicle 11 until the tension between servicer spacecraft 10 and client vehicle 11 releases, as indicated by boom tension indicator spring 33 or other switch or indicator. In some embodiments, quillons 29 may be retracted before undocking. Boom 43 is extended an amount sufficient to allow clearance for fingers 29 to retract in a direction toward probe tip 26 and is then retracted in a direction toward servicer spacecraft 10. Servicer spacecraft 10 may then maneuver away from client vehicle 11. In certain embodiments, it may be advantageous for boom 43 to further extend from servicer spacecraft 10 toward client vehicle 11 to impart a force on client vehicle 11 to facilitate undocking, before the boom 43 is retracted and servicer spacecraft 10 maneuvers away from client vehicle 11.

Figure 4:
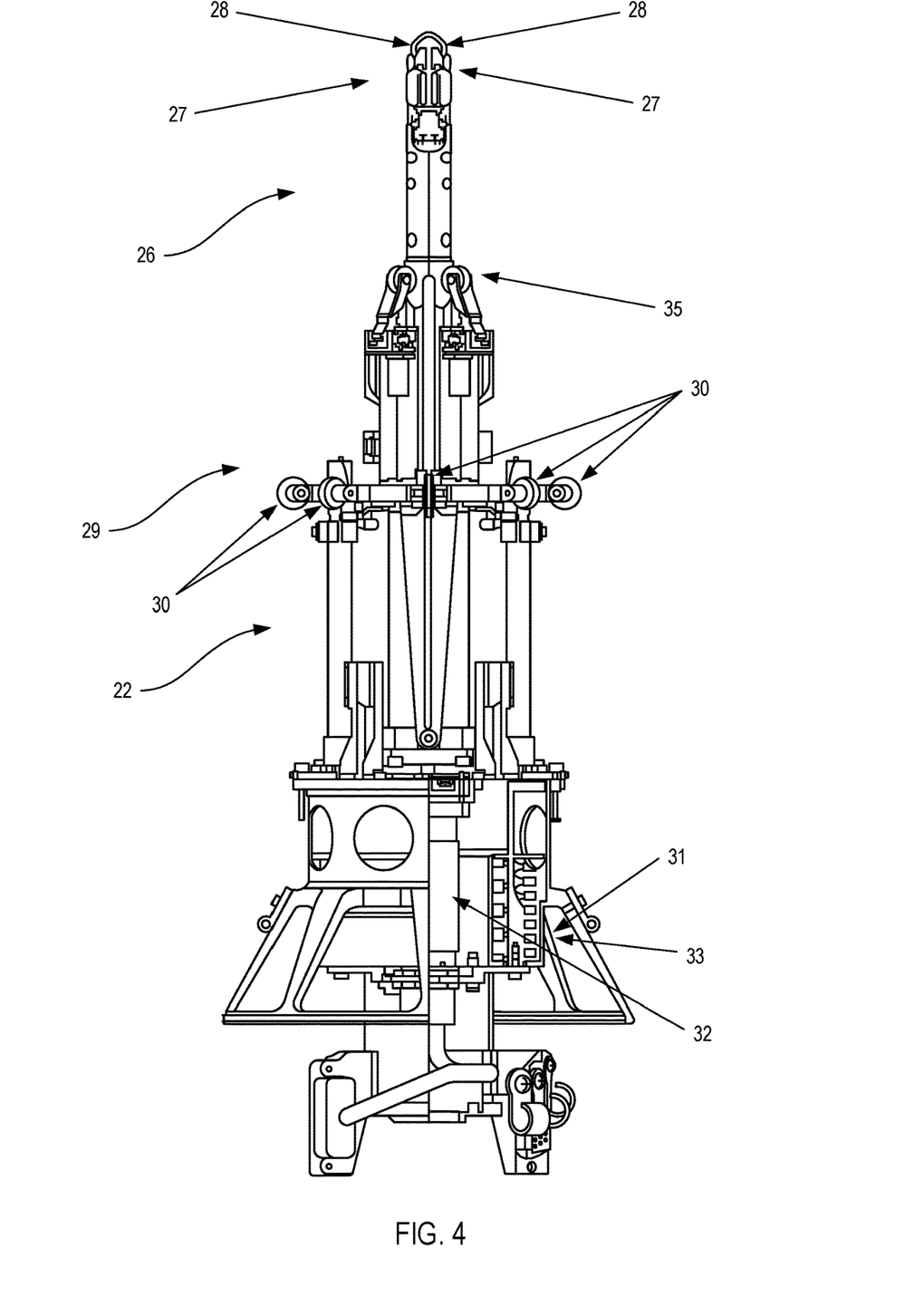
FIG. 4 is a partial cross-section view of the capture assembly, according to one or more embodiments.

FIG. 4 shows a perspective, partial cross-sectional view of a probe assembly 22 according to another embodiment. A probe tip 26 is positioned at a distal end of probe assembly 22. Probe tip 26 may include one or more fingers 27. Probe tip 26 may include one, two, three, four, or more fingers. Fingers 27 may be biased into a closed position by a spring or other device. Fingers 27 may be compliant such that a biasing force imparted on fingers 27 may allow the fingers 27 to pivot in a direction toward or away from probe tip 26 upon docking or undocking of servicer spacecraft 10 to client vehicle 11. A wheel, roller, or other friction reducing apparatus 28 may be positioned at the end of one or more fingers 27 to reduce any frictional force imparted by fingers 27 upon docking or undocking of servicer spacecraft 10 to client vehicle 11. Rollers 28 may be provided by means of one or more tip rollers provided on a floating pin. Wheel, roller, or other friction reducing apparatus 28 positioned at the end of one or more fingers 27 may be dry film lubricated and may have a spindle ratio of greater than or equal to 3.

Probe tip 26 may be movably attached to probe assembly 22. In certain embodiments, probe assembly 22 may include boom compression spring 31. Boom compression spring 31 may assist in preventing boom 43 (see FIG. 13) from being damaged upon contact of probe tip 26 with any part of client vehicle 11. In certain embodiments, probe assembly 22 may also include one or more throat detectors 35. Throat detectors 35 may be provided with rollers, wheels, or other friction reducing apparatuses on their tips. Wheels, rollers, or other friction reducing apparatuses of throat detector 35 may be dry film lubricated and may have a spindle ratio of greater than or equal to 3. Throat detectors 35 facilitate the probe assembly 22 by sensing the relative position of probe tip 26 within engine 18 of client vehicle 11.

Probe assembly 22 may include a quillon assembly 29. Quillon assembly 29 may comprise one or more rollers 30. Quillon assembly 29 may include one, two, three, four, five, six, seven, eight, or more rollers 30. Rollers 30 may be dry film lubricated and may have a spindle ratio of greater than or equal to 3. Quillon assembly 29 may be movable relative to probe tip 26 to facilitate docking and preloading of servicer spacecraft 10 to client vehicle 11. Upon docking of servicer spacecraft 10 to client vehicle 11, rollers 30 may contact a side wall of engine 18 of client vehicle 11 in a manner that may limit rotation of servicer spacecraft 10 in relation to client vehicle 11 during docking. Probe assembly 22 may also include an actuator 32. Actuator 32 may be configured to provide motion to actuate linear motion of components of probe assembly 22. Actuator 32 may cause internal components of probe tip 26 to move toward or away from client vehicle 11 that may assist in the docking or undocking of servicer spacecraft 10 to client vehicle 11. Actuator 32 may cause quillon assembly 29 to cinch the apex of throat 39 of engine 18 (see FIGS. 10 and 11). Actuator 32 may cause cam bar 34 (see FIG. 11) to translate relative to probe tip 26 to actuate fingers 27 to a deployed position or to a stowed position to facilitate the docking or undocking of servicer spacecraft 10 to client vehicle 11. In certain embodiments, probe assembly 22 may include boom tension indicator spring 33 or other components that facilitate providing a preload tension between servicer spacecraft 10 and client vehicle 11 or determining the amount of preload tension present when servicer spacecraft 10 and client vehicle 11 are docked. In some embodiments, the preload tension between servicer spacecraft 10 and client vehicle 11 is greater than or equal to 15 lbf. Boom compression spring 31 may limit peak levels of impact load.

Figures 5, 6:
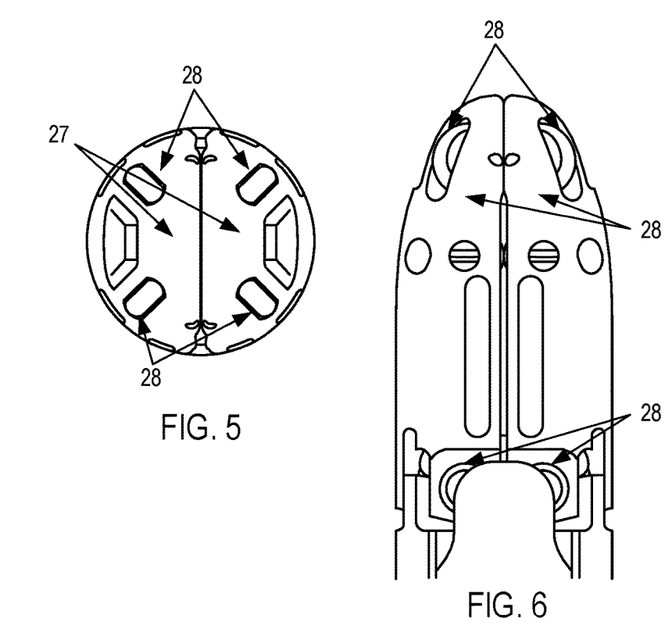
FIG. 5 is a top elevational view of a probe tip, according to one or more embodiments.
FIG. 6 is a side elevational view of a probe tip, according to one or more embodiments.
Figure 7:
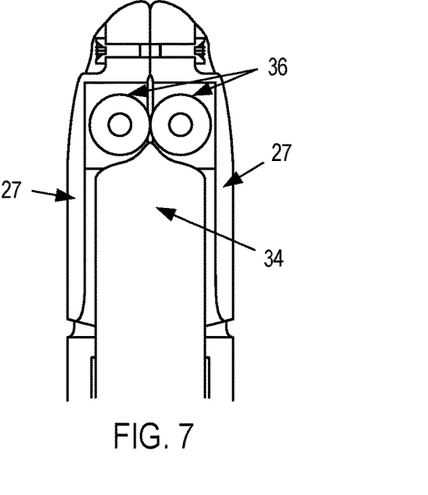
FIGS. 7-9 are side cross-sectional views of a probe tip, according to one or more embodiments.
Figure 8:
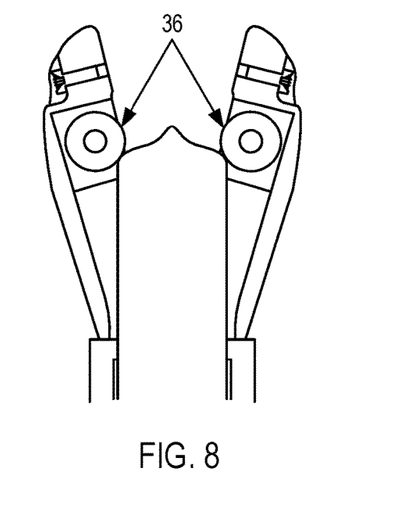
Figure 9:
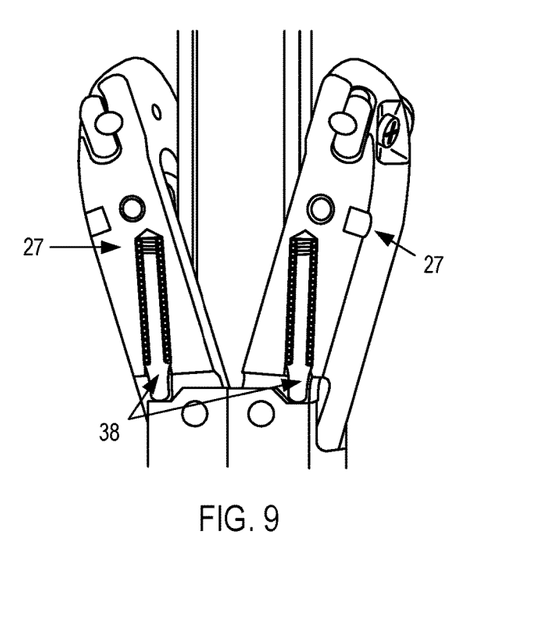

FIGS. 5-9 depict top and side elevation and cross-sectional views of probe tip 26 according to one embodiment. FIG. 5 is a top elevation view of probe tip 26 depicting two fingers 27 and four rollers 28 according to one embodiment. FIG. 6 is a side elevation view of probe tip 26 depicting two fingers 27 and rollers 28 according to one embodiment. FIG. 6 further depicts finger pivot pins 37 that provide for pivotal motion of fingers 27. FIG. 7 is a side cross-sectional view of probe tip 26 depicting fingers 27 in a retracted position. Fingers 27 may be provided with one or more splay rollers 36. Splay rollers 36 facilitate the deployment of fingers 27 in a pivotal motion when cam bar 34 (see FIG. 11) is extended toward the distal end of probe tip 26. FIG. 8 is a side cross-sectional view of probe tip 26 depicting fingers 27 in a deployed position. Fingers 27 may be provided with one or more splay rollers 36. As shown in FIG. 8, cam bar 34 may be extended toward the distal end of probe tip 26, providing a force on splay rollers 36 to deploy fingers 27 in a pivotal motion. FIG. 9 is a side cross-section view of probe tip 26 depicting fingers 27 in a deployed position. Springs or other apparatus 38 may be used to bias fingers 27 in a non-deployed position. In some embodiments, there may be one, two, or more springs 38 per finger 27.

Figure 10:
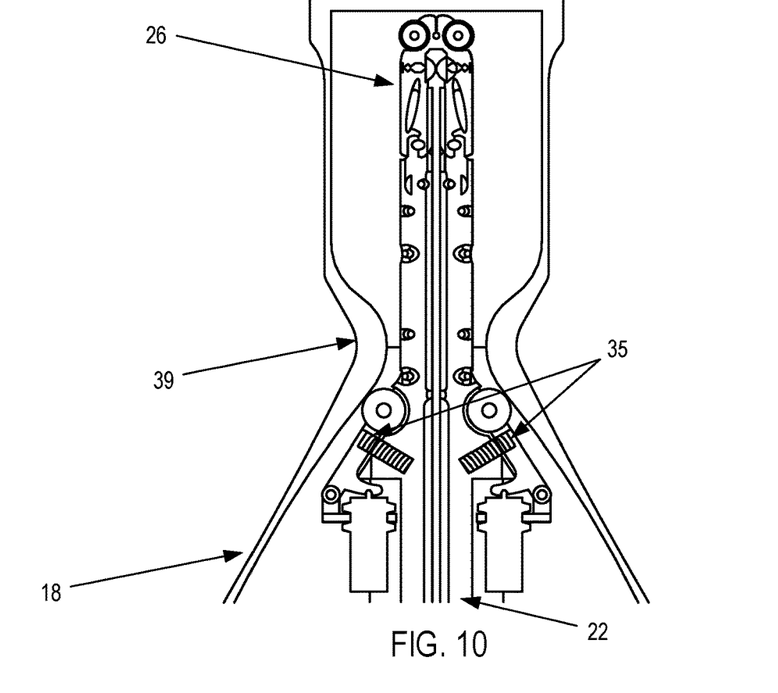
FIGS. 10 and 11 are cross-sectional views of a client vehicle engine and probe assembly, according to one or more embodiments.
Figure 11:
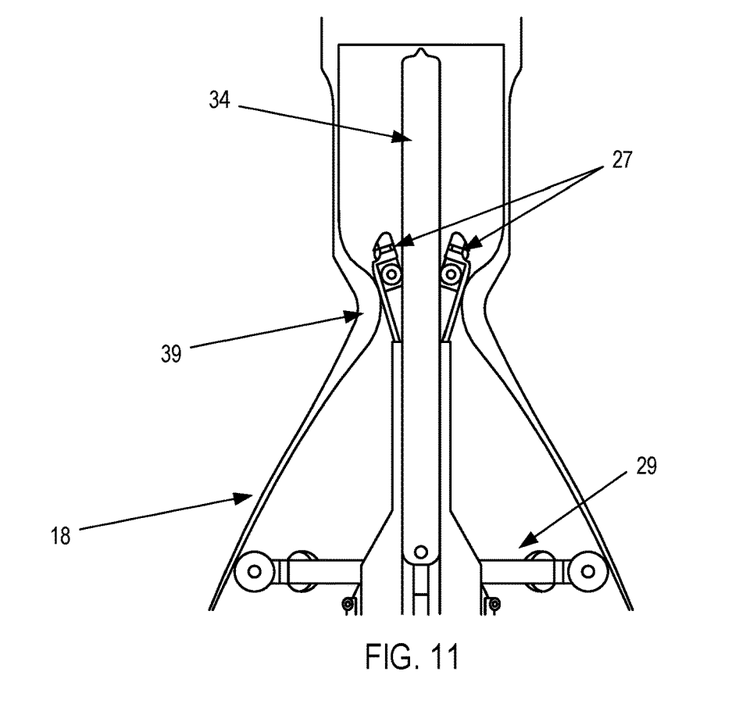

Docking according to the probe assembly 22 depicted in FIGS. 4-9 can be accomplished in a manner similar to that described with relation to FIG. 3 as further informed by FIGS. 10 and 11. FIGS. 10 and 11 depict a cross-sectional view of engine 18 upon insertion of probe tip 26. As depicted in FIG. 10, probe tip 26 has been inserted through the throat 39 of engine 18 until throat detectors 35 sense that the probe assembly 22 is positioned for docking. As depicted in FIG. 11, cam bar 34 has been extended to cause fingers 27 to deploy and contact throat 39. Quillon assembly 29 has been deployed to facilitate applying a cinch load on the apex of throat 39 of engine 18.

Figure 12:
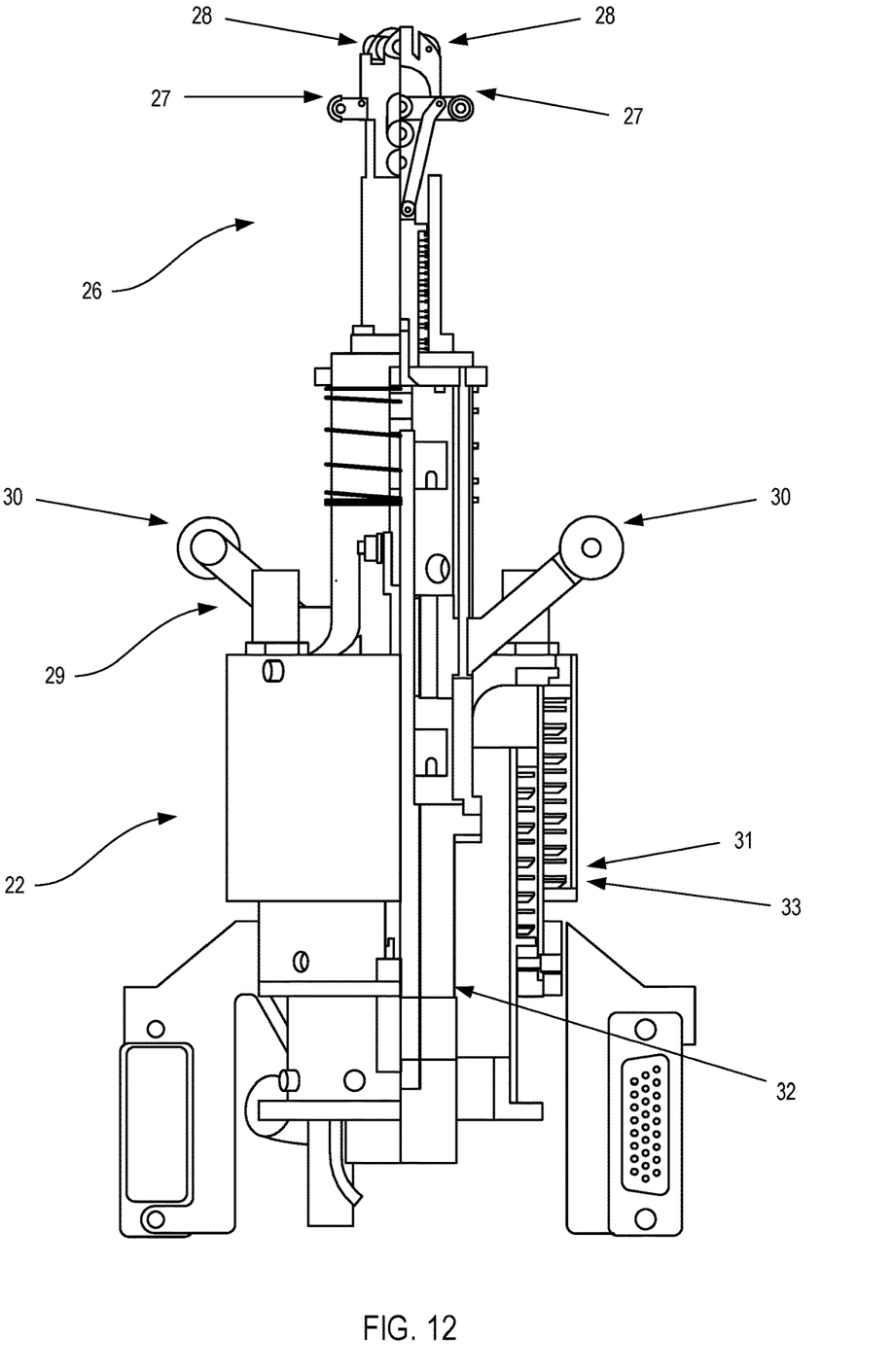
FIG. 12 is a perspective partial cross-sectional side view of a capture assembly, according to one or more embodiments.

FIG. 12 shows a perspective, partial cross-sectional side view of a probe assembly 22 according to another embodiment. A probe tip 26 is positioned at a distal end of probe assembly 22. Probe tip 26 may include one or more fingers 27. Probe tip 26 may include one, two, three, four, or more fingers. Fingers 27 may be biased into an open or closed position by a spring or other device. Fingers 27 may be compliant such that a biasing force imparted on fingers 27 may allow fingers to pivot in a direction toward or away from probe tip 26 upon docking or undocking of servicer spacecraft 10 to client vehicle 11. A wheel, roller, or other friction reducing apparatus 28 may be positioned at the end of one or more fingers 27 to reduce any frictional force imparted by fingers 27 upon docking or undocking of servicer spacecraft 10 to client vehicle 11. Wheel, roller, or other friction reducing apparatus 28 positioned at the end of one or more fingers 27 may be dry film lubricated and may have a spindle ratio of greater than or equal to 3. Probe tip 26 may have one or more rollers, wheels, or other friction reducing apparatuses 28 positioned at its distal end. There may be one, two, three, four, five or more rollers, wheels, or other friction reducing apparatuses 28 positioned at the distal end of probe tip 26. Wheel, roller, or other friction reducing apparatus 28 may be dry film lubricated and may have a spindle ratio of greater than or equal to 3. Probe tip 26 may be movably attached to probe assembly 22. Some embodiments may include boom compression spring 31 in probe assembly 22. Boom compression spring 31 may assist in preventing boom 43 (See FIG. 13) from being damaged upon contact of probe tip 26 with any part of client vehicle 11.

Probe assembly 22 may include a quillon assembly 29. Quillon assembly 29 may comprise one or more rollers 30. Quillon assembly 29 may include one, two, three, four, or more rollers 30. Rollers 30 may be dry film lubricated and may have a spindle ratio of greater than or equal to 3. Quillon assembly 29 may be movable to cinch the apex of throat 39 of engine 18 (FIGS. 10 and 11). Probe assembly 22 may also include an actuator 32. Actuator 32 may be configured to provide motion to actuate linear motion of components of probe assembly 22. Actuator 32 may cause internal components of probe tip 26 to move toward or away from client vehicle 11 that may assist in the docking or undocking of servicer spacecraft 10 to client vehicle 11. Actuator 32 may cause quillon assembly 29 to cinch the apex of throat 39 of engine 18. In certain embodiments, probe assembly 22 may include boom tension indicator spring 33 or other components that facilitate providing a preload tension between servicer spacecraft 10 and client vehicle 11 or determining the amount of preload tension present when servicer spacecraft 10 and client vehicle 11 when docked. As will be apparent to one of skill in the art, docking according to the probe assembly 22 depicted in FIG. 12 can be accomplished in manners similar to that described with relation to FIGS. 3-11.

Figure 13:
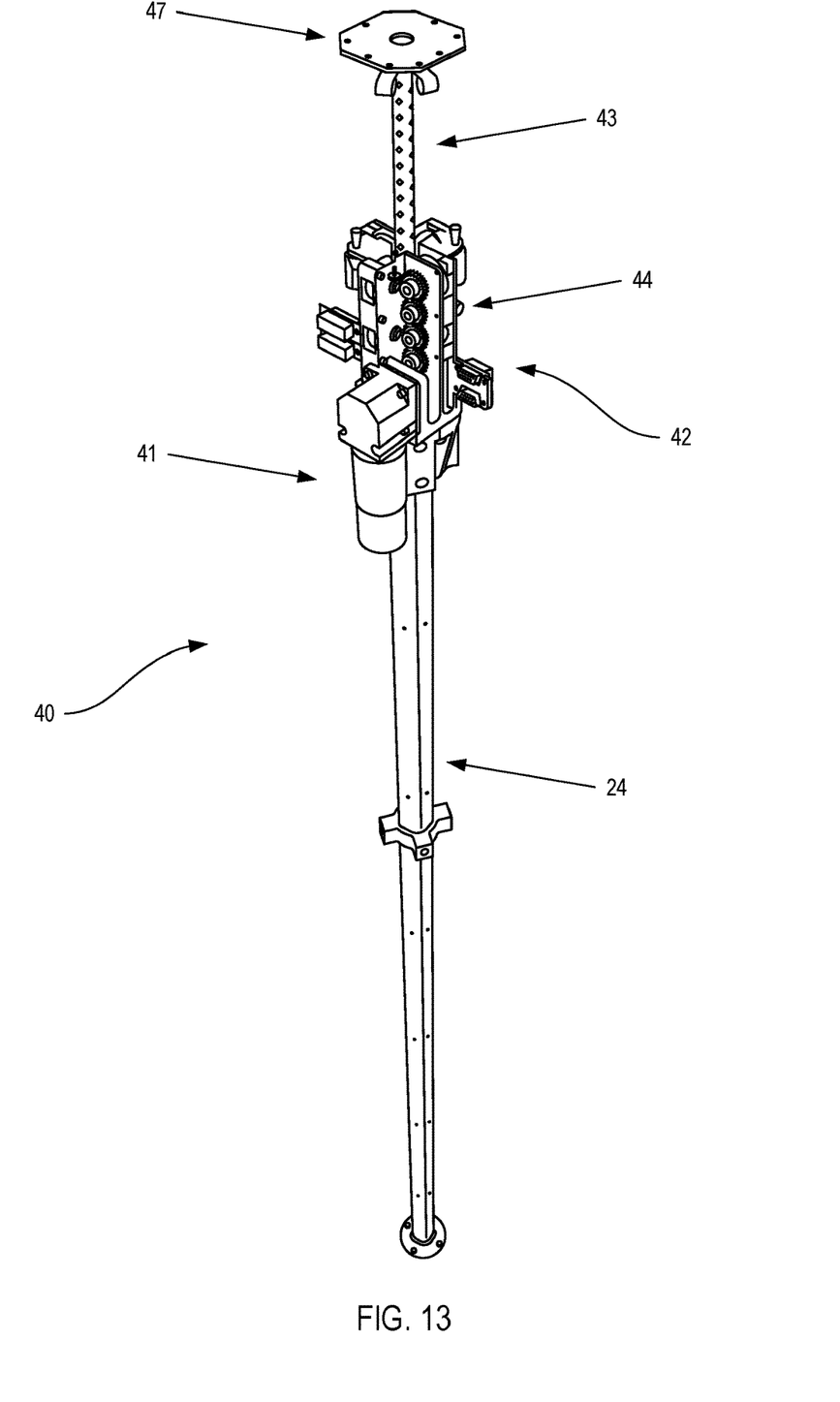
FIG. 13 is a perspective view of a compliant extension assembly, according to one or more embodiments.
Figure 14:
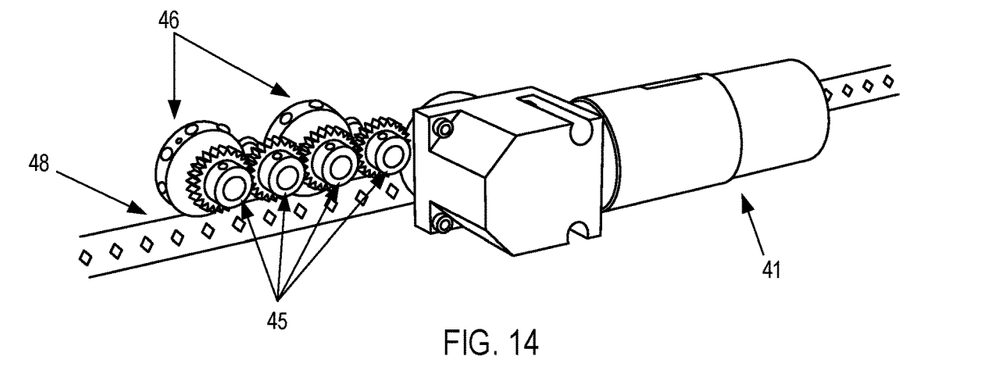
FIGS. 14 and 15 are perspective views of a compliant extension assembly, according to one or more embodiments.
Figure 15:
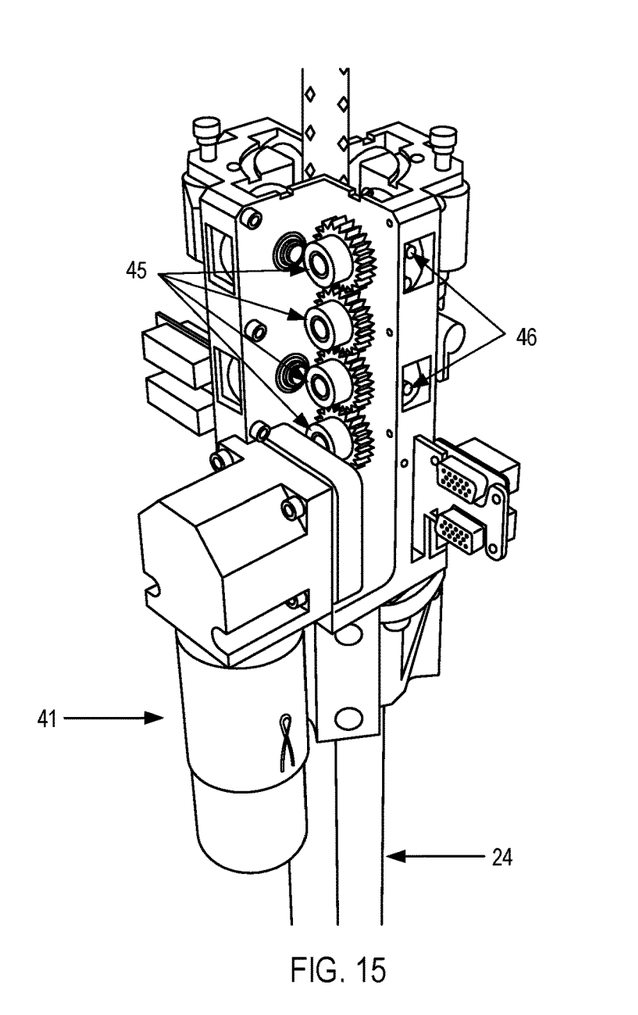

FIGS. 13-15 depict a compliant extension assembly 23 in the form of a lance system 40 according to one embodiment. Lance system 40 may be used in combination with a capture assembly 20 to facilitate the docking of a servicer spacecraft 10 to a client vehicle 11. Lance system 40 may comprise a lance motor 41, a drive system 42, a sheath 24, and a boom 43. Tip plug 47 is provided at a distal end of boom 43, and provides a mechanical interface between boom 43 and probe assembly 22 (see FIGS. 1 and 2). Lance motor 41 may be engaged to operatively control the extension of boom 43 from or retraction of boom 43 into sheath 24 using drive system 42. Drive system 42 provides a mechanical interface between lance motor 41 and boom 43, and may be provided in the form of a tractor drive system 44, that may include one or more gears 45 that may drive one or more pinned guide pulleys 46. Boom 43 may be provided with pin holes 48 corresponding to the pins on pinned guide pulleys 46. In operation, the embodiment depicted in FIGS. 13-15 may be operated by causing lance motor 41 to drive gears 45 of drive system 42. Gears 45 thereby drive rotation of pinned guide pulleys 46, the rotation of which causes the extension or retraction of boom 43 by means of interaction between pinned guide pulleys 46 and the pin holes 48 of boom 43. Sheath 24 houses the portion of boom 43 not extended from the nadir deck 13 of servicer spacecraft 10. In some embodiments, boom 43 may be designed to be substantially rigid to facilitate docking of servicer spacecraft 10 to client vehicle 11. In some embodiments, boom 43 may be designed to be substantially flexible to facilitate docking of servicer spacecraft 10 to client vehicle 11 by reducing friction between probe assembly 22 and engine 18 by reducing normal forces exerted on client vehicle 11 by probe assembly 22. Such normal forces may be present due to misalignment of probe assembly 22 during docking. Flexibility of boom 43 may reduce normal forces between servicer spacecraft 10 and client vehicle 11 during docking to less than or equal to 0.25 lbf.

In some embodiments, servicer spacecraft 10 may be provided with a controller communicatively connected to the capture assembly 20, the compliant extension assembly 23, or both. The controller may be an Earth-based computer system communicatively connected to servicer spacecraft 10 via radio signal or other suitable wireless communication methods. Alternatively, the controller may be included in servicer spacecraft 10, or in a third spacecraft, such as a client vehicle 11 that is in communication with the servicer spacecraft 10. In other embodiments, the controller function may be accomplished by any combination of Earth-based, servicer-spacecraft-based, or third-spacecraft-based controllers. The controller may be a combination of hardware and/or software for executing a set of instructions for docking a servicer spacecraft 10 to a client vehicle 11. Hardware, software, firmware, or a combination of the foregoing may be included in the controller and may be configured to execute a set of instructions to control servicer spacecraft 10. For example, the controller may utilize sensors in the servicer spacecraft 10 to determine when the servicer spacecraft 10 and client vehicle 11 are within docking range of the capture assembly 20. The controller may control extension or retraction of boom 43, and the engagement, disengagement, or operation of probe assembly 22. The controller may determine when the probe assembly 22 is successfully inserted in engine 18 and then deploy fingers 27 of the probe tip 26 of the probe assembly 22. The controller may control the servicer spacecraft 10 to retract boom 43, thereby engaging fingers 27 with engine 18, capturing client vehicle 11. The controller may control the servicer spacecraft 10 to extend boom 43 and thereby undock servicer spacecraft 10 from client vehicle 11.

Further example embodiments are disclosed below.

Embodiment 1: A system for capturing a client vehicle in space, the client vehicle having an engine, comprising: a propulsion mechanism for maneuvering the system in space; and a capture mechanism for at least temporarily joining the system to the client vehicle, wherein the capture mechanism includes a probe with a friction reducing element.

Embodiment 2: The system of Embodiment 1, wherein the engine of the client vehicle is a liquid apogee engine.

Embodiment 3: The system of Embodiment 1, wherein the friction reducing element is substantially positioned at a distal end of the probe.

Embodiment 4: The system of Embodiment 3, wherein the friction reducing element is a first item of structural significance at the distal end of the probe.

Embodiment 5: The system of Embodiment 1, wherein the friction reducing element is one or more rollers.

Embodiment 6: The system of Embodiment 5, wherein the one or more rollers are dry film lubricated.

Embodiment 7: The system of Embodiment 5, wherein the one or more rollers have a spindle ratio of greater than or equal to 3.

Embodiment 8: The system of Embodiment 1, wherein the probe includes one or more quillons positioned near a distal end of the probe.

Embodiment 9: The system of Embodiment 8, wherein at least one of the one or more quillons includes a roller.

Embodiment 10: The system of Embodiment 9, wherein the at least one of the one or more quillons including a roller is a first or second item of structural significance at the distal end of the probe.

Embodiment 11: The system of Embodiment 9, wherein the roller is dry film lubricated.

Embodiment 12: The system of Embodiment 9, wherein the roller has a spindle ratio of greater than or equal to 3.

Embodiment 13: The system of Embodiment 1, wherein the probe is disposed to be actuated into the engine.

Embodiment 14: The system of Embodiment 13, wherein the probe may be actuated at a rate that reduces the amount of time friction can be present during a capture event.

Embodiment 15: The system of Embodiment 14, wherein the rate is greater than or equal to 15 millimeters/second.

Embodiment 16: The system of Embodiment 1, wherein the probe may be employed to capture the client vehicle using a passive capture technique.

Embodiment 17: The system of Embodiment 16, wherein the probe comprises a spring-loaded barb finger.

Embodiment 18: The system of Embodiment 17, wherein the probe comprises at least two spring-loaded barb fingers.

Embodiment 19: The system of Embodiment 18, wherein the probe and spring-loaded barb fingers are inserted into the engine.

Embodiment 20: The system of Embodiment 19, wherein the insertion of the spring-loaded barb fingers into the engine creates less than or equal to 5 millimeters/second delta velocity between the system and the client vehicle.

Embodiment 21: The system of Embodiment 1, wherein the probe is inserted into the engine, and wherein the probe comprises a spring.

Embodiment 22: The system of Embodiment 21, wherein the spring is used to detect a throat of the engine.

Embodiment 23: The system of Embodiment 21, wherein the spring is used to passively cinch the throat.

Embodiment 24: The system of Embodiment 21, wherein the spring is used to passively cinch the throat using one or more spring-loaded quillons.

Embodiment 25: The system of Embodiment 24, wherein the spring is used to passively return the barb fingers.

Embodiment 26: The system of Embodiment 21, wherein the spring is used to provide tension compliance.

Embodiment 27: The system of Embodiment 26, wherein the spring providing tension compliance allows for acceleration of the client vehicle from a first velocity to a second velocity without the spring reaching full extension or full compression.

Embodiment 28: The system of Embodiment 26, wherein the spring providing tension compliance provides a mechanism for preloading the client vehicle to the system with greater than or equal to 15 lbf.

Embodiment 29: The system of Embodiment 21, wherein the spring is used to provide compression compliance.

Embodiment 30: The system of Embodiment 29, wherein the spring providing compression compliance allows for acceleration of the client vehicle from a first velocity to a second velocity without the spring reaching full extension or full compression.

Embodiment 31: The system of Embodiment 29, wherein the spring providing compression compliance reduces frictional force imparted on the client vehicle by the servicer spacecraft.

Embodiment 32: A system for capturing a client vehicle in space, the client vehicle having an engine, comprising: a propulsion mechanism for maneuvering the system in space; a capture mechanism for at least temporarily joining the system to the client vehicle; and a boom for carrying the capture mechanism and movably positioning the capture mechanism relative to the client vehicle.

Embodiment 33: The system of Embodiment 32, wherein the boom is flexible.

Embodiment 34: The system of Embodiment 33, wherein the probe is disposed to be actuated into the engine.

Embodiment 35: The system of Embodiment 34, wherein the boom is sufficiently flexible to reduce friction by reducing normal forces exerted on the client vehicle by the system.

Embodiment 36: The system of Embodiment 35, wherein the normal forces exerted on the client vehicle are due to misalignment of the probe during actuation into the engine.

Embodiment 37: The system of Embodiment 36, wherein the normal forces are reduced to less than or equal to 0.25 lbf.

Embodiment 38: A method for capturing a client vehicle in space using a capture mechanism, the client vehicle having an engine, comprising: maneuvering the capture mechanism into proximity of the engine; providing a friction reducing element on the capture mechanism to reduce friction between the capture mechanism and the engine upon contact of the capture mechanism with the engine; inserting the capture mechanism in the engine; and actuating the capture mechanism to removably join the capture mechanism to the engine.

Embodiment 39: The method of Embodiment 38, wherein the engine of the client vehicle is a liquid apogee engine.

Embodiment 40: The method of Embodiment 38, wherein the provided friction reducing element is substantially positioned at a distal end of the capture mechanism.

Embodiment 41: The method of Embodiment 40, wherein the provided friction reducing element is a first item of structural significance at the distal end of the probe.

Embodiment 42: The method of Embodiment 38, wherein the provided friction reducing element is one or more rollers.

Embodiment 43: The method of Embodiment 42, wherein the one or more rollers are dry film lubricated.

Embodiment 44: The method of Embodiment 42, wherein the one or more rollers have a spindle ratio of greater than or equal to 3.

Embodiment 45: The method of Embodiment 38, wherein the capture mechanism is inserted in the engine at a rate that reduces the amount of time friction can be present during a capture event.

Embodiment 46: The method of Embodiment 45, wherein the rate is greater than or equal to 15 millimeters/second.

Embodiment 47: The method of Embodiment 38, wherein the capture mechanism removably joins the capture mechanism to the engine using spring-loaded barb fingers.

Embodiment 48: The method of Embodiment 47, wherein the capture mechanism comprises at least two spring-loaded barb fingers.

Embodiment 49: The method of Embodiment 47, wherein the inserting the capture mechanism in the engine creates less than or equal to 5 millimeters/second delta velocity between the method and the client vehicle.

Embodiment 50: The method of Embodiment 38, wherein the method further comprises detecting a throat of the engine.

Embodiment 51: The method of Embodiment 50, wherein the method further comprises detecting the throat of the engine with a spring.

Embodiment 52: The method of Embodiment 51, wherein the method further comprises using the spring to passively cinch the throat.

Embodiment 53: The method of Embodiment 51, wherein the method further comprises using the spring to passively cinch the throat using one or more spring-loaded quillons.

Embodiment 54: The method of Embodiment 51, wherein the method further comprises using the spring to provide tension compliance.

Embodiment 55: The method of Embodiment 54, wherein the method further comprises allowing for acceleration of the client vehicle from a first velocity to a second velocity without the spring reaching full extension or full compression using the spring providing tension compliance.

Embodiment 56: The method of Embodiment 54, wherein the method further comprises providing a mechanism for preloading the client vehicle to the capture apparatus with greater than or equal to 15 lbf using the spring providing tension compliance.

Embodiment 57: The method of Embodiment 51, wherein the method further comprises using the spring to provide compression compliance.

Embodiment 58: The method of Embodiment 57, wherein the method further comprises allowing for acceleration of the client vehicle from a first velocity to a second velocity without the spring reaching full extension or full compression using the spring providing compression compliance.

Embodiment 59: The method of Embodiment 57, wherein the method further comprises reducing frictional force imparted on the client vehicle by the servicer spacecraft using the spring providing compression compliance.

Embodiment 60: A method for capturing a client vehicle in space using a boom for carrying a capture mechanism, the client vehicle having an engine, comprising: maneuvering the capture mechanism into proximity of the engine; moving the capture mechanism relative to the engine using the boom; inserting the capture mechanism in the engine; and actuating the capture mechanism to removably join the capture mechanism to the engine.

Embodiment 61: The method of Embodiment 60, wherein the boom is flexible.

Embodiment 62: The method of Embodiment 61, wherein the boom is sufficiently flexible to reduce friction by reducing normal forces exerted on the client vehicle by the method.

Embodiment 63: The method of Embodiment 62, wherein the normal forces exerted on the client vehicle are due to misalignment of the probe during actuation into the engine.

Embodiment 64: The method of Embodiment 63, wherein the normal forces are reduced to less than or equal to 0.25 lbf.

Embodiment 65: A system for capturing a client vehicle in space, the client vehicle having an engine, comprising: a propulsion mechanism for maneuvering the system in space; and a capture mechanism for at least temporarily joining the system to the client vehicle, wherein the capture mechanism includes a probe with an ability to cinch.

Embodiment 66: The system of Embodiment 65, wherein the engine of the client vehicle is a liquid apogee engine.

Embodiment 67: The system of Embodiment 65, wherein the cinch includes contacting at least two sides of the engine.

Embodiment 68: The system of Embodiment 67, wherein the cinch includes contacting at least two sides of an apex of a throat of the engine.

Embodiment 69: The system of Embodiment 68, wherein the ability to cinch is passive.

Embodiment 70: The system of Embodiment 69, wherein the ability to cinch is effectuated through a spring-loaded slide.

Embodiment 71: The system of Embodiment 68, wherein the cinch limits motion of the client vehicle about the apex to between approximately +/−3 degrees.

Embodiment 72: A method for capturing a client vehicle in space using a capture mechanism, the client vehicle having an engine, comprising: maneuvering the capture system in space in proximity to the engine of the client vehicle; and joining the capture mechanism to the client vehicle using a probe with an ability to cinch.

Embodiment 73: The method of Embodiment 72, wherein the engine of the client vehicle is a liquid apogee engine.

Embodiment 74: The method of Embodiment 72, wherein joining the capture mechanism to the client vehicle by means of the probe with an ability to cinch further includes contacting at least two sides of the engine.

Embodiment 75: The method of Embodiment 74, wherein joining the capture mechanism to the client vehicle using the probe with an ability to cinch further includes contacting at least two sides of an apex of a throat of the engine.

Embodiment 76: The method of Embodiment 75, wherein the ability to cinch is passive.

Embodiment 77: The method of Embodiment 76, wherein the ability to cinch is effectuated through a spring-loaded slide.

Embodiment 78: The method of Embodiment 75, wherein the cinch limits motion of the client vehicle about the apex to between approximately +/−3 degrees.

The embodiments of the disclosure described above and illustrated in the accompanying drawing figures do not limit the scope of the disclosure, since these embodiments are merely examples of embodiments of the disclosure. The disclosure is defined by the appended claims and their legal equivalents. Any equivalent embodiments lie within the scope of this disclosure. Indeed, various modifications of the present disclosure, in addition to those shown and described herein, such as alternative useful combinations of the elements described, will become apparent to those of ordinary skill in the art from the description. Such modifications and embodiments also fall within the scope of the appended claims and their legal equivalents. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for capturing a client vehicle having an engine, comprising:
    a propulsion mechanism for maneuvering the system in space;
    a capture mechanism for at least temporarily joining the system to the client vehicle, wherein the capture mechanism includes a probe with one or more movable elements positioned at a distal end of the probe, wherein the distal end of the probe is adapted to be inserted into a cavity of the client vehicle and to engage with a portion of the client vehicle defining the cavity, the one or more movable elements configured to pivot laterally outward and inward relative to the probe to engage with and disengage with the portion of the client vehicle defining the cavity;
    an engagement assembly to engage with another portion of the client vehicle; and
    an actuator to move the one or more movable elements relative to the engagement assembly, wherein the actuator is configured to move the engagement assembly relative to the one or more movable elements in order to engage the engagement assembly with the another portion the client vehicle and to pivot the one or more movable elements laterally outward relative to the probe and toward the client vehicle in order to engage with the portion of the client vehicle defining the cavity or laterally inward relative to the probe and away from the client vehicle in order to disengage with the portion of the client vehicle defining the cavity to assist in docking or undocking of the system with the client vehicle.

2. The system of claim 1, wherein the capture mechanism is sized and configured to dock with a liquid apogee engine of the client vehicle.

3. The system of claim 1, wherein the engagement assembly is configured to engage with the another portion of the client vehicle defining the cavity.

4. The system of claim 1, wherein the engagement assembly comprises a quillon assembly having one or more pillions including a roller.

5. The system of claim 1, further comprising a deployment mechanism for moving the one or more movable elements, the deployment mechanism configured to move independently of the one or more movable elements.

6. The system of claim 1, wherein the probe is configured to be actuated at a rate greater than or equal to 10 millimeters per second in order to minimize an amount of friction during capture of the client vehicle.

7. The system of claim 1, wherein the probe comprises at least two spring-loaded barb fingers adapted to be inserted into the cavity of the client vehicle.

8. The system of claim 1, wherein the engagement assembly is configured to slide relative to the probe in order to translate in an axial manner toward or away from a probe tip of the probe.

9. The system of claim 1, wherein the probe comprises a spring adapted to be used to detect a throat of the engine of the client vehicle.

10. The system of claim 1, wherein the probe comprises a spring adapted to passively cinch the engine of the client vehicle.

11. The system of claim 1, wherein the probe comprises a spring adapted to reduce frictional force imparted on the client vehicle.

12. The system of claim 1, further comprising a cam element configured to move relative to the capture mechanism to rotate the one or more movable elements between a deployed position and a stowed position, the cam element being configured to move independently of the one or more movable elements to selectively engage with and apply a force to the one or more movable elements in order to rotate the one or more movable elements laterally outward or laterally inward relative to the probe between the deployed position and the stowed position.

13. A system for capturing a client vehicle, comprising:
a propulsion mechanism for maneuvering the system in space;
a capture mechanism for at least temporarily joining the system to a portion of the client vehicle, wherein the capture mechanism includes a probe with a cinch mechanism, the cinch mechanism comprising one or more movable elements for engaging with the client vehicle in a deployed position, wherein the one or more movable elements are biased into the deployed position;
a deployment mechanism for moving the one or more movable elements of the cinch mechanism, the deployment mechanism configured to move the one or more movable elements against a biasing force from the deployed position to a retracted position, wherein the deployment mechanism is configured to move linearly relative to the capture mechanism in order to actuate the capture mechanism, wherein the biasing force is configured to return the one or more movable elements back to the deployed position; and
an engagement assembly to engage with another portion of the client vehicle, the engagement assembly being spaced from the capture mechanism along a length of the probe, the deployment mechanism configured to move the engagement assembly relative to the capture mechanism.

14. The system of claim 13, wherein the capture mechanism is sized and configured to dock with a liquid apogee engine of the client vehicle.

15. The system of claim 14, wherein the cinch mechanism is configured to contact at least two points of an apex of a throat of the engine.

16. The system of claim 15, wherein the cinch mechanism is configured to limit motion of the client vehicle about the apex to between approximately +/− three degrees.

17. The system of claim 13, wherein the one or more movable elements are configured to rotate between the retracted position and the deployed position, wherein linear movement of the deployment mechanism relative to the one or more movable elements is configured to rotate the one or more movable elements inward to the retracted position.

18. The system of claim 13, wherein the deployment mechanism comprises a cam element comprising one or more engagement surfaces configured to move through and beyond the cinch mechanism in an outward direction toward an intended position of the client vehicle to move the one or more movable elements to an actuated state and to maintain the one or more movable elements in the actuated state as the cam element moves beyond the cinch mechanism, the cam element being configured to move independently of the one or more movable elements to selectively engage with and apply a force to the one or more movable elements with the one or more engagement surfaces in order to move the one or more movable elements between the deployed position and the retracted position.

19. A system for capturing a client vehicle, comprising:
a probe for at least temporarily joining the system to the client vehicle, the probe comprising:
a capture mechanism having one or more movable elements for engaging with a first portion of the client vehicle positioned at a distal end of the probe, the distal end of the probe adapted to be inserted into a cavity of the client vehicle in a deployed position, the one or more movable elements being biased in one of the deployed position or a stowed position;
a deployment mechanism configured to move relative to the capture mechanism to move the one or more movable elements of the capture mechanism between the deployed position and the stowed position, the deployment mechanism configured to move independently of the one or more movable elements to selectively engage with and apply a force to the one or more movable elements at an outer engagement surface in order to move the one or more movable elements between the deployed position and the stowed position, the deployment mechanism exhibiting at least one substantially constant dimension at the outer engagement surface that is further configured maintain the one or more movable elements in one of the deployed position or the stowed position as at least a portion of the deployment mechanism exhibiting the at least one substantially constant dimension at the outer engagement surface moves beyond the one or more movable elements in a direction toward the client vehicle; and
an engagement assembly to engage with another portion of the client vehicle, the engagement assembly being spaced from the capture mechanism along a length of the probe, the probe configured to move the engagement assembly relative to the capture mechanism, wherein the deployment mechanism is configured to move with the engagement assembly relative to the capture mechanism.

20. The system of claim 19, further comprising a compliant extension assembly for carrying the capture mechanism and the engagement assembly and for movably positioning the capture mechanism and the engagement assembly in unison relative to the client vehicle, the compliant extension assembly being movable independently from the capture mechanism and the engagement assembly, and wherein at least a portion of the compliant extension assembly is flexible in a manner to reduce friction by reducing normal forces exerted on the client vehicle by the system.

* * * * *